(12) United States Patent
Yi et al.

(10) Patent No.: US 9,265,061 B2
(45) Date of Patent: Feb. 16, 2016

(54) METHOD FOR TRANSMITTING BUFFER STATUS REPORT FROM TERMINAL IN WIRELESS COMMUNICATION SYSTEM AND APPARATUS THEREFOR

(75) Inventors: Seungjune Yi, Anyang-si (KR);
Sungduck Chun, Anyang-si (KR);
Sunghoon Jung, Anyang-si (KR);
Youngdae Lee, Anyang-si (KR);
Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 13/698,012

(22) PCT Filed: Jun. 16, 2011

(86) PCT No.: PCT/KR2011/004394
§ 371 (c)(1),
(2), (4) Date: Nov. 14, 2012

(87) PCT Pub. No.: WO2011/159102
PCT Pub. Date: Dec. 22, 2011

(65) Prior Publication Data
US 2013/0058220 A1    Mar. 7, 2013

Related U.S. Application Data

(60) Provisional application No. 61/356,552, filed on Jun. 18, 2010.

(51) Int. Cl.
*H04W 24/10*    (2009.01)
*H04W 72/12*    (2009.01)
(Continued)

(52) U.S. Cl.
CPC ...... *H04W 72/1284* (2013.01); *H04W 28/0278* (2013.01); *H04L 5/001* (2013.01); *H04L 5/0023* (2013.01); *H04L 5/0098* (2013.01); *H04W 72/1221* (2013.01)

(58) Field of Classification Search
CPC ............ H04W 72/1284; H04W 28/04; H04W 72/1252; H04W 28/14; H04W 28/12; H04W 28/02; H04L 47/30; H04L 47/10; H04L 47/14
USPC ............................ 370/241, 252, 329; 710/56
See application file for complete search history.

(56) References Cited

U.S. PATENT DOCUMENTS

| 2009/0080380 A1* | 3/2009 | Chun .................... H04W 28/06 370/329 |
| 2009/0113066 A1* | 4/2009 | Van Wie ............. H04L 12/1827 709/231 |

(Continued)

FOREIGN PATENT DOCUMENTS

| KR | 10-2008-0015693 A | 2/2008 |
| KR | 10-2009-0044156 A | 5/2009 |
| WO | WO 2011/121112 A1 | 10/2011 |

OTHER PUBLICATIONS

3GPP, "Technical Specification Group Radio Access Network; Evolved Universal Terrestrial Radio Access (E-UTRA); Medium Access Control (MAC) protocol specification (Release 9)", 3GPP TS 36.321 V9.2.0, Mar. 2010, pp. 1-45, XP050402557.

(Continued)

*Primary Examiner* — Candal Elpenord
(74) *Attorney, Agent, or Firm* — Birch, Stewart, Kolasch & Birch, LLP

(57) ABSTRACT

Disclosed is a method for transmitting a buffer status report from a terminal in a wireless communication system. In particular, the method comprises the steps of: generating buffer status report information; and transmitting the buffer status report information to a base station, wherein the buffer status report information includes a first field containing a plurality of indicators and at least one second field indicating a buffer size index, wherein each of the plurality of indicators indicates the presence or absence of the second field corresponding to each of at least one logical channel group (LCG). Preferably, the buffer status report information may contain a third field corresponding to each of the at least one second field, and each of the third fields may contain an identifier of a buffer size table reference by the buffer size index contained in the second field.

6 Claims, 12 Drawing Sheets

(51) Int. Cl.
*H04W 28/02* (2009.01)
*H04L 5/00* (2006.01)

(56) References Cited

U.S. PATENT DOCUMENTS

| | | | |
|---|---|---|---|
| 2009/0113086 A1* | 4/2009 | Wu et al. .......................... | 710/56 |
| 2009/0175229 A1* | 7/2009 | Tseng ................. | H04W 28/065 370/329 |
| 2010/0008307 A1* | 1/2010 | Torsner ................... | H04L 47/30 370/329 |
| 2010/0077100 A1* | 3/2010 | Hsu ................... | H04W 72/1221 709/234 |
| 2010/0085926 A1* | 4/2010 | Harada ............... | H04W 28/065 370/329 |
| 2010/0098011 A1* | 4/2010 | Pelletier ............ | H04W 72/1242 370/329 |
| 2010/0150082 A1* | 6/2010 | Shin et al. ...................... | 370/329 |
| 2010/0265896 A1* | 10/2010 | Park ................... | H04W 72/0413 370/329 |
| 2011/0141983 A1* | 6/2011 | Hong ................. | H04W 28/0278 370/329 |
| 2011/0242972 A1* | 10/2011 | Sebire ..................... | H04L 67/06 370/229 |

OTHER PUBLICATIONS

LG Electronics Inc., "BSR format for CA", 3GPP TSG-RAN2 Meeting #70bis, R2-103938, Stockholm, Sweden, Jun. 28-Jul. 2, 2010, pp. 1-4, XP050605241.

Nokia Siemens Networks et al., "Addition of Empty BSR-PHR MAC control element", 3GPP TSG-RAN Meeting #67, R2-094213, Shenzhen, China, Aug. 24-28, 2009, 4 pages, XP050352399.

Nokia Siemens Networks et al., "BSR for Carrier Aggregation", 3GPP TSG-RAN WG2 Meeting #70, R2-102805, Montreal, Canada, May 10-14, 2010, 2 pages, XP050423147.

* cited by examiner

FIG. 3
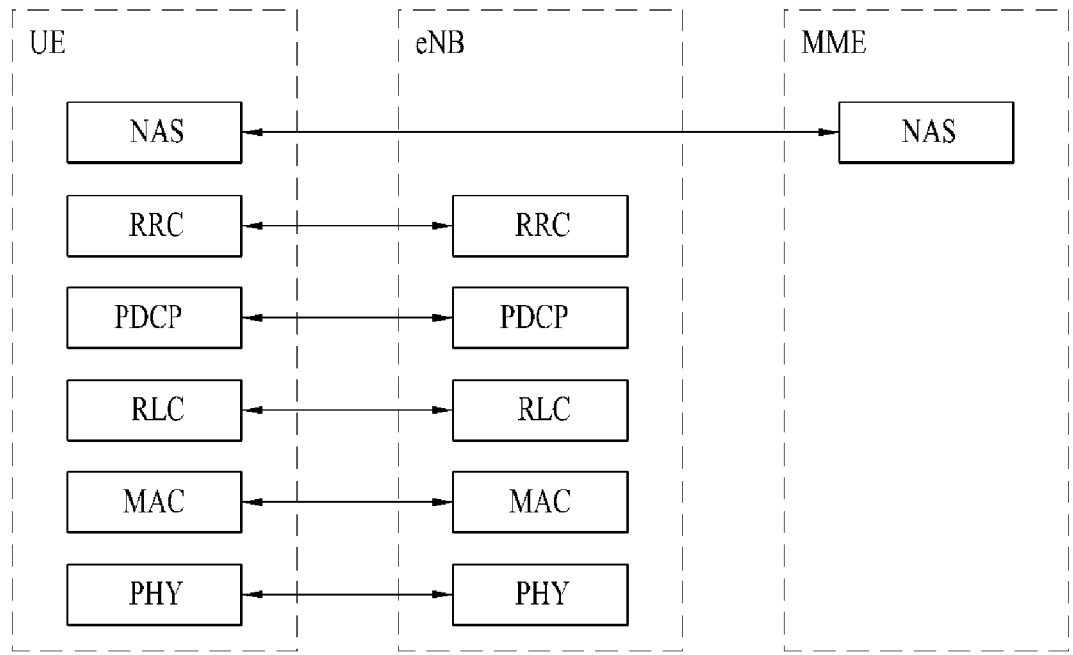
(a) control-plane protocol stack
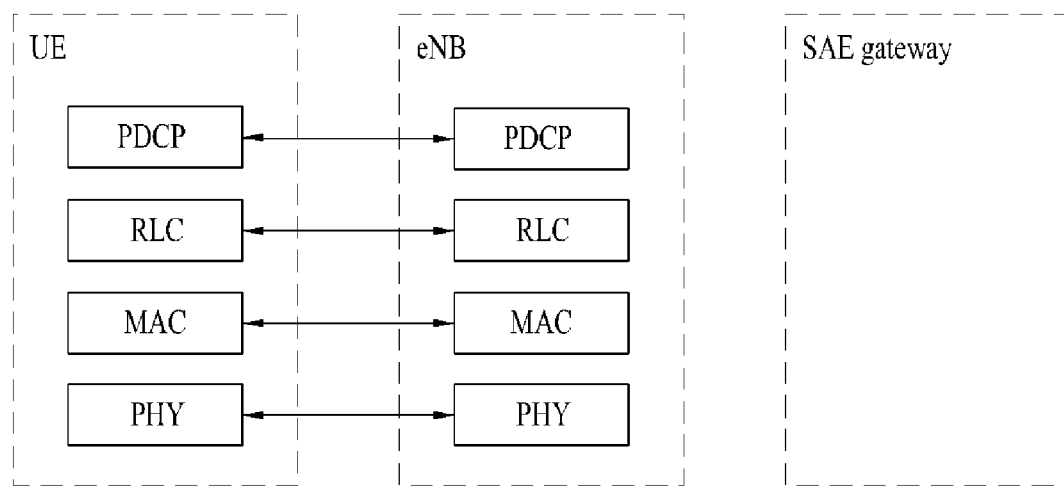
(b) user-plane protocol stack FIG. 7
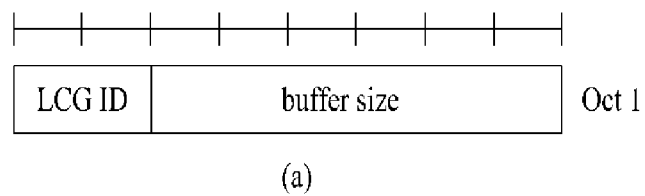
(a)
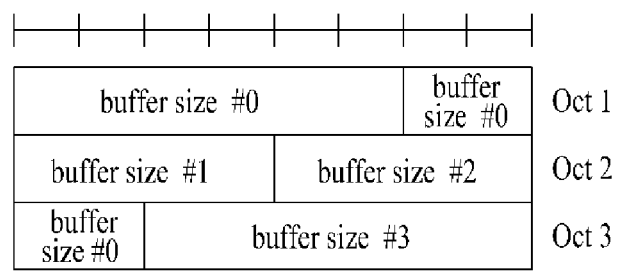
(b)

R/R/E/LCID subheader

FIG. 9

[MAC subheader]

| R | R | E | LCID = short BSR-CA |
|---|---|---|---|

[MAC CE ]

| LCG ID<br>2 bits | buffer size (6 bits)<br>based on extended BSR table |
|---|---|

FIG. 10

[MAC subheader]

| R | R | E | LCID = Long BSR-CA |
|---|---|---|---|

[MAC CE]

| R | R | R | R | 0 | 1 | 0 | 1 | bitmap (4 bits) |
|---|---|---|---|---|---|---|---|---|
| BSR table ID 2 bits | buffer size #0 (6 bits) corresponding to BSR table ID | | | | | | | existence only if LCG bit is set to 1 |
| BSR table ID 2 bits | buffer size #2 (6 bits) corresponding to BSR table ID | | | | | | | |

FIG. 11

[MAC subheader]

| R | R | E | LCID = Long BSR-CA |
|---|---|---|---|

[MAC CE]

| BSR table ID (2 bits) | buffer size #0 (6 bits) corresponding to BSR table ID |
|---|---|
| BSR table ID (2 bits) | buffer size #1 (6 bits) corresponding to BSR table ID |
| BSR table ID (2 bits) | buffer size #2 (6 bits) corresponding to BSR table ID |
| BSR table ID (2 bits) | buffer size #3 (6 bits) corresponding to BSR table ID |

METHOD FOR TRANSMITTING BUFFER STATUS REPORT FROM TERMINAL IN WIRELESS COMMUNICATION SYSTEM AND APPARATUS THEREFOR

CROSS-REFERENCE TO RELATED APPLICATIONS

This non-provisional application is a National Stage entry under 35 U.S.C. §371 of International Application No. PCT/KR2011/004394 filed on Jun. 16, 2011, which claims the benefit of U.S. Provisional Application No. 61/356,552 filed on Jun. 18, 2010. The entire contents of all of the above applications are hereby incorporated by reference.

TECHNICAL FIELD

The present invention relates to a wireless communication system, and more particularly, to a method for transmitting buffer status report from a user equipment in a wireless communication system and an apparatus therefor.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. For wider frequency bandwidth, carrier aggregation aims to use a plurality of frequency blocks as one great logical frequency band. A bandwidth of each frequency block may be defined based on a bandwidth of a system block used in the LTE system. Each frequency block is transmitted using a component carrier.

DISCLOSURE

Technical Problem

Based on aforementioned discussion, an object of the present invention devised to solve the conventional problem is to provide a method for transmitting buffer status report from a user equipment in a wireless communication system and an apparatus therefor.

Technical Solution

In one aspect of the present invention, a method for transmitting a buffer status report from a user equipment in a wireless communication system comprises the steps of generating buffer status report information; and transmitting the buffer status report information to a base station, wherein the buffer status report information includes a first field including a plurality of indicators and at least one second field indicating a buffer size index, wherein each of the plurality of indicators indicates the presence or absence of the second field corresponding to each of at least one logical channel group (LCG).

Preferably, the buffer status report information includes at least one third field corresponding to each of the at least one second field, and each of the at least one third field includes an identifier of a buffer size table referred to determine the buffer size index included in the at least one second field. Alternatively, each of the at least one third field may indicate whether buffer size indicated by a corresponding second field is more than a specific value.

In this case, if a buffer size of a corresponding logical channel group is less than a specific value, the buffer size index is determined by referring to a first buffer size table, which quantizes buffer size less than the specific value, and if the buffer size of the corresponding logical channel group is more than the specific value, the buffer size index is determined by referring to a second buffer size table, which quantizes buffer size more than the specific value.

In another aspect of the present invention, a method for transmitting a buffer status report from a user equipment in a wireless communication system comprises the steps of generating buffer status report information including buffer size information; and transmitting the buffer status report information to a base station, wherein the buffer status report information includes a buffer size index and an identifier of a buffer size table, which is referred to determine the buffer size index. In this case, the buffer status report information includes identifier information of a logical channel group (LCG) corresponding to the buffer size information.

Preferably, if a buffer size of the logical channel group is less than a specific value, the buffer size index is determined by referring to a first buffer size table, which quantizes buffer size less than the specific value, and if the buffer size of the logical channel group is more than the specific value, the buffer size index is determined by referring to a second buffer size table, which quantizes buffer size more than the specific value.

In other aspect of the present invention, a method for transmitting a buffer status report from a user equipment in a wireless communication system comprises the steps of generating buffer status report information; and transmitting the buffer status report information to a base station, wherein the buffer status report information includes buffer size information configured to correspond to each of at least one logical channel group (LCG) in the order of index of the at least one logical channel group, and the buffer size information includes a buffer size index corresponding to each of the at least one logical channel group and an identifier of a buffer size table referred to determine the buffer size index.

In the aforementioned aspects, the specific value is preferably 150 kbytes.

Advantageous Effects

According to the embodiments of the present invention, the user equipment may effectively transmit a buffer status report to the base station.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 3 is a diagram illustrating structures of a control plane and a user plane of a radio interface protocol between a user equipment and an E-UTRAN based on the 3GPP radio access network standard;

FIG. 7 is a diagram illustrating an example of a buffer status report (BSR) defined in an LTE system;

FIG. 9 is a diagram illustrating a MAC subheader and a MAC CE format of a short BSR-CA according to the embodiment of the present invention;

FIG. 10 is a diagram illustrating a MAC subheader and a MAC CE format of a long BSR-CA according to the embodiment of the present invention;

FIG. 11 is another diagram illustrating a MAC subheader and a MAC CE format of a short BSR-CA according to the embodiment of the present invention.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

Figure 1:
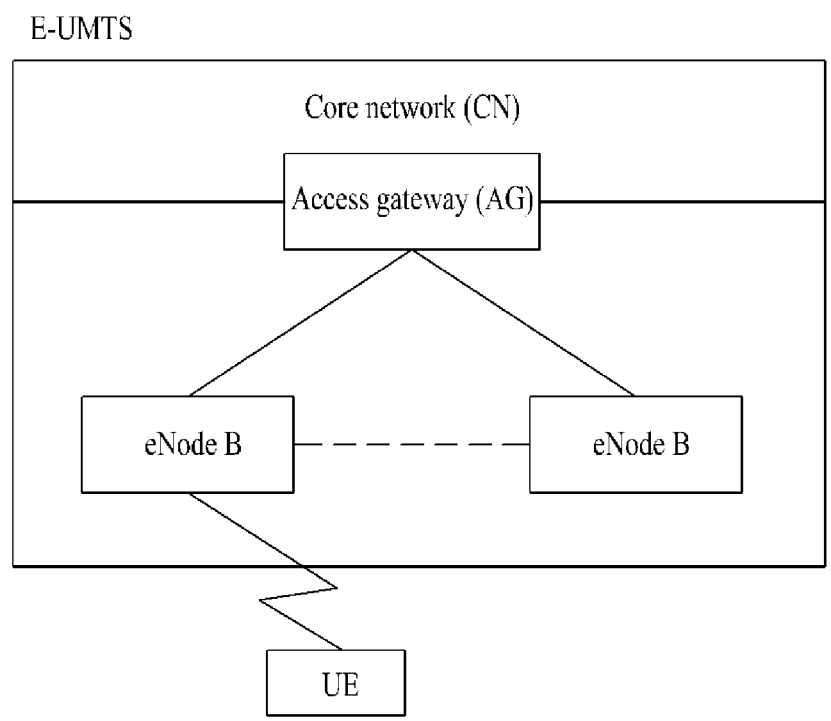
FIG. 1 is a diagram illustrating a network structure of an Evolved Universal Mobile Telecommunications System (E-UMTS), which is an example of a wireless communication system.
Figure 2:
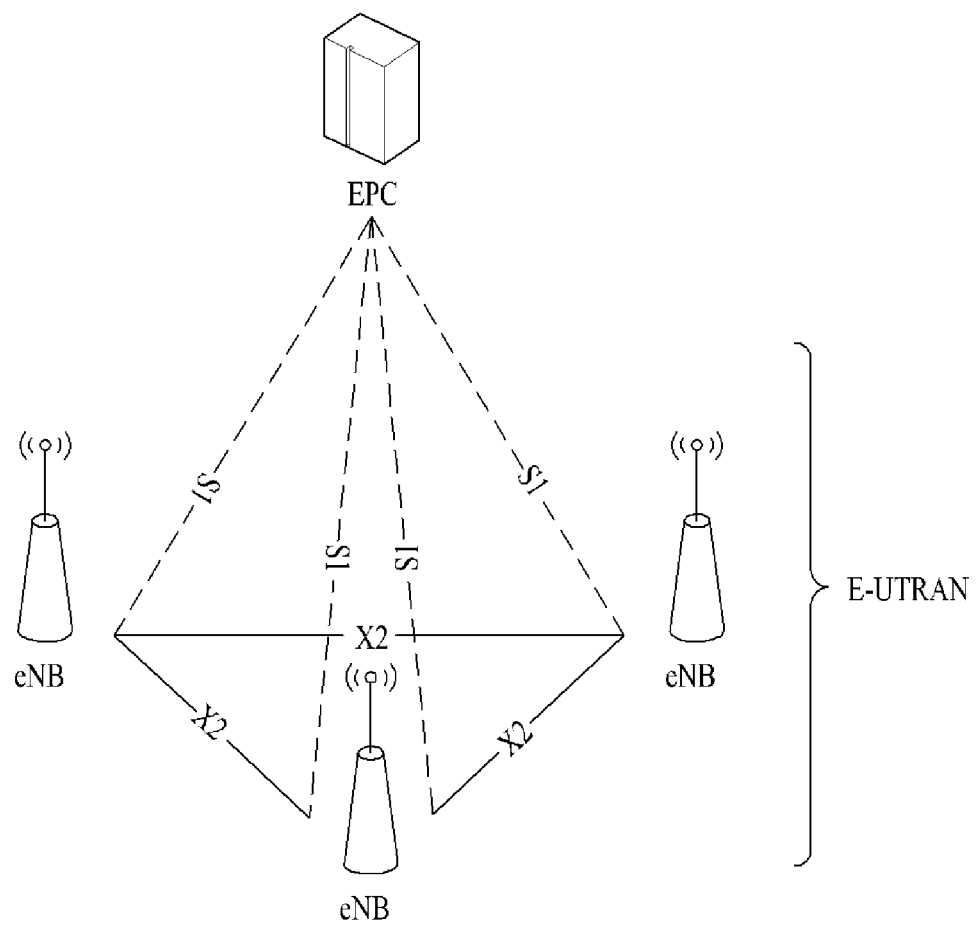
FIG. 2 is a diagram illustrating a network structure of an evolved universal terrestrial radio access network (E-UTRAN)

FIG. 2 is a diagram illustrating a network structure of an Evolved Universal Terrestrial Radio Access Network (E-UTRAN) which is an example of a mobile communication system. The E-UTRAN system is an evolved version of the conventional UTRAN system. The E-UTRAN includes cells (eNBs), which are connected with each other through an interface X2. Also, each of the cells is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment. The access information or the ability information is mainly used for mobility management of the user equipment. The S-GW is a gateway having the E-UTRAN as an end point, and the PDN-GW is a gateway having a packet data network (PDN) as an end point.

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel.

The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via a logical channel. The RLC layer of the second layer supports reliable data transfer. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
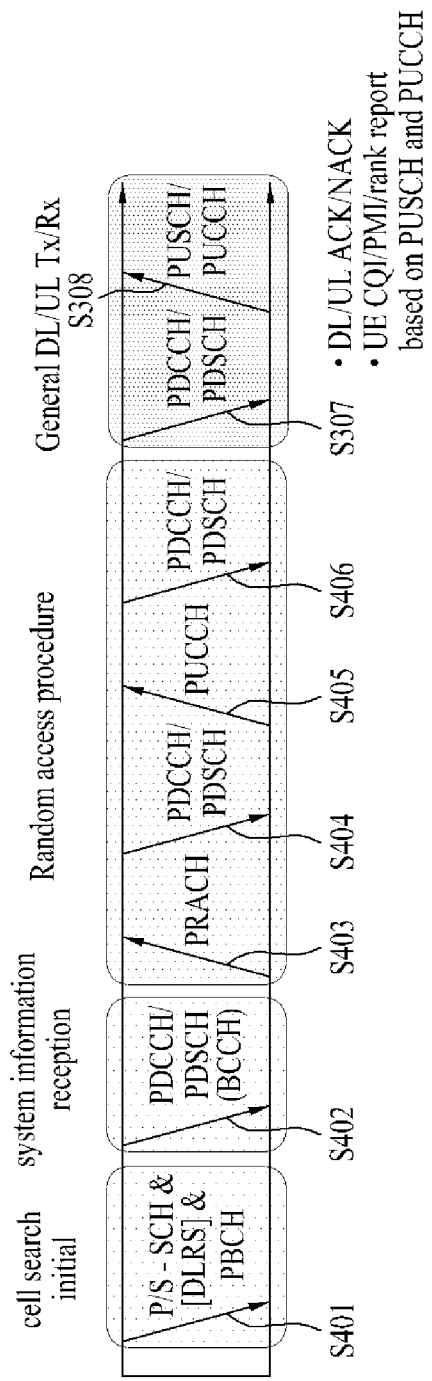
FIG. 4 is a diagram illustrating physical channels used in a 3GPP system and a general method for transmitting a signal using the physical channels.

FIG. 4 is a diagram illustrating physical channels used in a 3GPP system and a general method for transmitting a signal using the physical channels.

The user equipment performs initial cell search such as synchronizing with the base station when it newly enters a cell or the power is turned on (S401). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S402).

In the meantime, if the user equipment initially accesses the base station, or if there is no radio resource for signal transmission, the user equipment may perform a random access procedure (RACH) for the base station (S403 to S406). To this end, the user equipment may transmit a preamble of a specific sequence through a physical random access channel (PRACH) (S403 and S405), and may receive a response message to the preamble through the PDCCH and the PDSCH corresponding to the PDCCH (S404 and S406). In case of a contention based RACH, a contention resolution procedure may be performed additionally.

The user equipment which has performed the aforementioned steps may receive the PDCCH/PDSCH (S407) and transmit a physical uplink shared channel (PUSCH) and a physical uplink control channel (PUCCH) (S408), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 5:
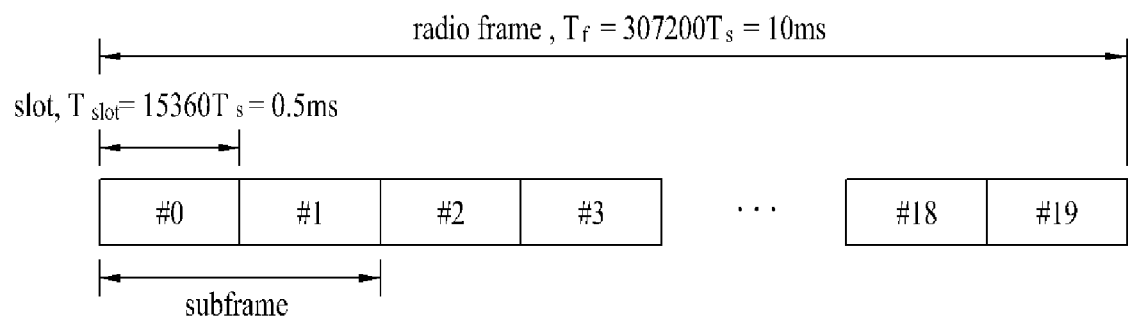
FIG. 5 is a diagram illustrating a structure of a radio frame used in an LTE system.

FIG. 5 is a diagram illustrating a structure of a radio frame used in an LTE system.

Referring to FIG. 5, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain. In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Hereinafter, RRC state of the user equipment and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state.

Since the E-UTRAN may identify the presence of the user equipment which is in the RRC_CONNECTED state, on the basis of cell unit, it may effectively control the user equipment. On the other hand, the E-UTRAN may not identify the user equipment which is in the RRC_IDLE state, on the basis of cell unit. In this case, the user equipment is managed by the core network (CN) on the basis of tracking area (TA) unit which is a local unit greater than the cell unit. In other words, in order that the user equipment which is in the RRC_IDLE state receives a normal mobile communication service such as voice or data, the user equipment should be shifted to the RRC_CONNECTED state.

In particular, when the user initially turns on the power of the user equipment, the user equipment searches for a proper cell and then is maintained in the RRC_IDLE state in the corresponding cell. The user equipment maintained in the RRC idle state performs RRC connection with the RRC layer of the E-UTRAN only if the RRC connection is required, and then is shifted to the RRC_CONNECTED state. In this case, the case where the RRC connection is required may include a case where uplink data transmission is required due to calling attempt of the user or a case where a response message to a paging message transmitted from the E-UTRAN should be transmitted.

Figure 6:
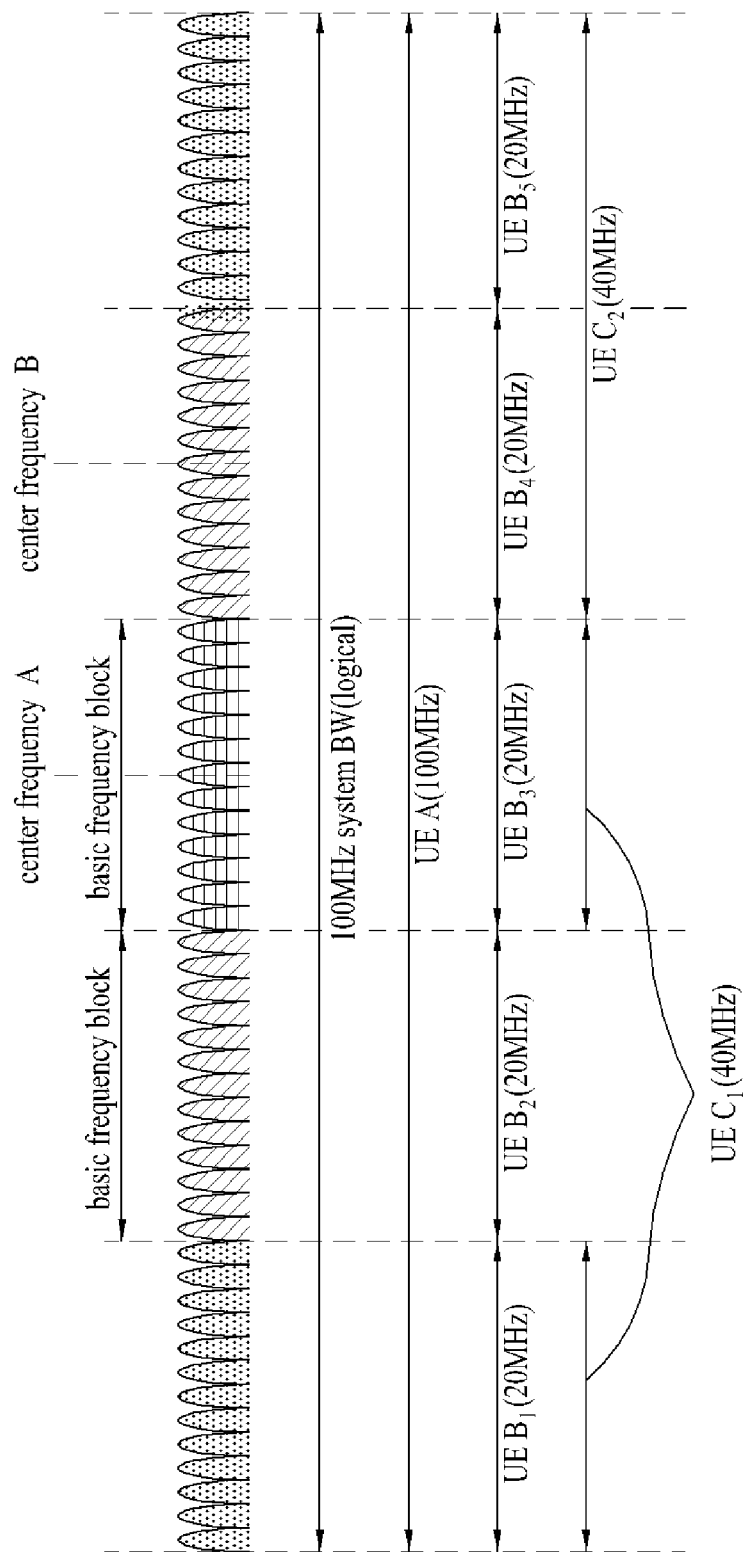
FIG. 6 is a conceptional diagram illustrating a carrier aggregation scheme.

FIG. 6 is a conceptional diagram illustrating a carrier aggregation scheme. The carrier aggregation means that the user equipment uses a plurality of frequency blocks or (logical) cells, which include uplink resources (or component carriers) and/or downlink resources (or component carriers), as one large logical frequency band to enable a wireless communication system to use a wider frequency band. Hereinafter, for convenience of description, the carrier aggregation will be referred to as component carriers.

Referring to FIG. 6, a whole system bandwidth (system BW) is a logical band and has a bandwidth of 100 MHz. The whole system bandwidth includes five component carriers, each of which has a bandwidth of maximum 20 MHz. The component carrier includes at least one or more physically continuous subcarriers. Although the respective component carriers have the same bandwidth in FIG. 6, it is only exemplary, and the component carriers may have their respective bandwidths different from one another. Also, although the respective component carriers adjoin each other in the frequency domain as shown, the drawing just represents the logical concept. The respective component carriers may logically adjoin each other, or may be spaced apart from each other.

A center frequency may be used differently for each of the component carriers. Alternatively, one center carrier common for physically adjoining component carriers may be used. For example, assuming that all component carriers are physically adjacent to one another in FIG. 6, a center carrier 'A' may be used. Also, assuming a case that the respective component carriers are not physically adjacent to each other, a center carrier 'A', a center carrier 'B', and the like may be used separately for the respective component carriers.

In this specification, a component carrier may correspond to a system bandwidth of a legacy system. By defining a component carrier based on a legacy system, it is possible to facilitate provision of backward compatibility and system design in a wireless communication environment in which an evolved user equipment and a legacy user equipment coexist. For example, in case that the LTE-A system supports carrier aggregation, each component carrier may correspond to a system bandwidth of the LTE system. In this case, the component carrier may have a bandwidth selected from the group including 1.25 MHz, 2.5 MHz, 5 MHz, 10 MHz and 20 MHz.

In case that a whole system band is extended by carrier aggregation, a frequency band used for communication with each user equipment is defined by a component carrier unit. A user equipment A may use a whole system bandwidth of 100 MHz and performs communication using five component carriers all. User equipments $B_1$ to $B_5$ may use a bandwidth of 20 MHz only, and each of the user equipments $B_1$ to $B_5$ performs communication using one component carrier. User equipment $C_1$ and user equipment $C_2$ may use a bandwidth of 40 MHz. Each of the user equipment $C_1$ and the user equipment $C_2$ performs communication using two component carriers. In this case, these two component carriers may be logically/physically adjacent to each other or may not. The user equipment $C_1$ represents a case of using two component carriers that are not adjacent to each other. And, the user equipment $C_2$ represents a case that two adjacent component carriers are used.

Next, a buffer status report (BSR) performed by the MAC layer will be described in more detail. In the LTE system, for efficient use of radio resources of the uplink, the base station should know how many data and what kind of data should be transmitted to each user equipment through the uplink. Accordingly, the user equipment may directly transmit information on its desired uplink data to the base station, and the base station may allocate uplink resources to the corresponding user equipment on the basis of the information on the uplink data. In this case, the information on the uplink data transmitted from the user equipment to the base station is the quantity of uplink data stored in a buffer of the user equipment, and will be referred to as a buffer status report (BSR).

The user equipment transmits the BSR in the form of MAC control element (CE), and the BSR includes two types of short BSR and long BSR in the LTE system according to the related art. The buffer status report (BSR) will be described in more detail with reference to FIG. 7.

FIG. 7 is a diagram illustrating an example of a buffer status report (BSR) defined in an LTE system. In particular, (a) of FIG. 7 illustrates a data structure of a short BSR, and (b) of FIG. 7 illustrates a data structure of a long BSR.

Referring to FIG. 7, whether the user equipment selects and transmits which one of short BSR and long BSR will be determined on the basis of the number of logical channel groups (LCG) where uplink data exist. In other words, the user equipment transmits the short BSR if there are data to be transmitted to one LCG only, and the user equipment transmits the long BSR if there are data to be transmitted to two or more LCGs. In this case, the LCG means that several logical channels of which quality of service (QoS) is similar to one another are grouped. In the current LTE system, four LCGs having LCG IDs of 0 to 3 are used. The base station notifies the user equipment of a logical channel group (LCG) to which the logical channel of the radio bearer (RB) belongs, when the radio bearer (RB) is established.

Also, the user equipment transmits the short BSR together with logical channel group (LCG) ID to indicate a logical channel group (LCG) to which a buffer size field representing buffer size corresponds. However, the user equipment transmits the long BSR including buffer size field in the order of the logical channel group having LCG ID of 0 to the logical channel group having LCG ID of 3 without LCG ID.

Figure 8:
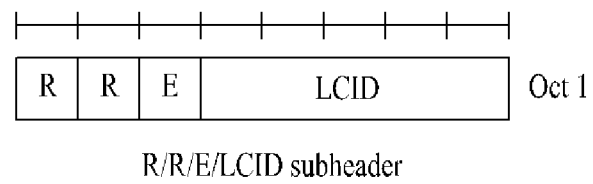
FIG. 8 is a diagram illustrating a structure of a MAC subheader defined in an LTE system.

FIG. 8 is a diagram illustrating a structure of a MAC subheader defined in an LTE system. In particular, FIG. 8 illustrates a structure of R/R/E/LCID type subheader.

Referring to FIG. 8, R is a reserved bit and is set to 0. Also, E is an extension field and includes a flag bit indicating whether an additional field exists in MAC header. In other words, if E is set to 1, it indicates that another R/R/E/LCID type subheader exists.

Finally, LCID is a logical channel ID field, and indicates whether a corresponding logical channel or MAC CE exists. For example, in the existing LTE system, if LCID is set to 11101, it indicates that MAC CE, which includes a short BSR, exists. If LCID is set to 11110, it indicates that MAC CE, which includes a long BSR, exists.

In the meantime, the user equipment transmits a buffer status report (BSR) to the base station if a BSR trigger condition is satisfied. In the current LTE system, BSR trigger conditions are defined as follows.

1) In a state that there are no data for transmission even in case of any LCG, and in a state that there are data for transmission in case of a specific LCG, if there are data for transmission in LCG having higher priority than that of the specific LCG, "Regular BSR" is triggered.

2) In a state that a padding bit of MAC PDU that may be generated on the basis of allocated uplink radio resources has a size equal to or greater than sum of size of BSR MAC CE and size of the corresponding MAC subheader, "Padding BSR" is triggered.

3) In a state that a padding bit of MAC PDU that may be generated on the basis of allocated uplink radio resources has a size equal to or greater than sum of size of BSR MAC CE and size of the corresponding MAC subheader but has a size smaller than sum of size of long BSR MAC CE and size of the corresponding MAC header, if there are data for transmission in two or more LCGs, "Truncated BSR" is triggered.

4) If a timer (periodicBSR-Timer) used for periodic BSR transmission expires, "Periodic BSR" is triggered.

If the buffer status report (BSR) is triggered by the aforementioned conditions 1) to 4), the user equipment identifies a buffer status, that is, buffer size for each LCG. At this time, the buffer size is a total sum of data on standby for transmission in a PDCP buffer and RLC in each logical channel. The buffer size for one logical channel group (LCG) means a total sum of data on standby for transmission in a buffer of every logical channel which belongs to the LCG.

If the buffer size for each LCG is identified, the user equipment allows a buffer size index corresponding to the identified buffer size to be included in a buffer size field of the buffer status report (BSR) by using Table 1 quantized as follows. Since the buffer size field is set to 6 bits, the buffer size of the LCG is reported by one of a total of 64 ranges, and the buffer size between 0 kbyte and 150 kbytes is reported. Currently, the buffer size more than 150 kbytes is not exactly expressed but information more than 150 kbytes is only reported.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26467 |
| 52 | 26467 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

In the LTE system according to the related art, considering maximum uplink transport block size of 75376 bits and twice round trip time (2 RTT=16 ms), maximum buffer size that may be indicated by the buffer status report (BSR) is defined as 150 kbytes. On the other hand, in the LTE-A system, a data transmission rate may be increased theoretically ten times due to a carrier aggregation scheme in which five component carriers may be aggregated and an uplink MIMO scheme in which two antenna ports may be used for uplink transmission. As a result, the buffer size of 1500 kbytes corresponding to ten times may occur.

However, if the user equipment transmits the buffer status report (BSR) on the basis of Table 1 according to the related art, since the buffer size between 150 kbytes and 1500 kbytes is simply reported as information more than 150 kbytes without any classification, the base station has difficulty in efficiently scheduling uplink radio resources to user equipments of which buffer size exceeds 150 kbytes.

Also, if a newly quantized table is defined to express all of 0 kbyte to 1500 kbytes as 6 bits corresponding to a BS field size included in a BSR MAC CE of the related art, since values between respective levels are more increased than those of Table 1 according to the related art, a problem occurs in that it is inefficient when the buffer size is small.

In addition to the aforementioned problem, a problem occurs in that unnecessary information is transmitted in case of the buffer status report (BSR) according to the related art. In other words, when the long BSR is transmitted, buffer sizes for four LCGs are always transmitted together with the long BSR. Even though the user equipment actually uses one LCG only, buffer sizes for the other three LCGs are reported unnecessarily. In the current LTE system, the logical channel may have a total of 16 priorities. In accordance with these priorities, one logical channel is included in one of four LCGs. If more LCGs are defined in a more advanced system, according to the long BSR of the related art, a buffer size report for all the LCGs causes waste of radio resources.

Accordingly, the present invention suggests that a table for reporting buffer sizes exceeding 150 kbytes is newly defined in addition to the existing Table 1 and the user equipment selects a table depending on data to be reported. Also, the present invention suggests that BSR transmission is performed for LCG only, which requires BSR transmission, to efficiently use radio resources.

First of all, in the present invention, in order that the user equipment effectively reports buffer sizes of maximum 1500 kbytes to the base station, an extended BSR table indicating buffer size levels of additional 150 kbytes to 1500 kbytes is defined in addition to Table 1 indicating buffer size levels of 0 kbyte to 150 kbytes. New buffer size levels include a total of 64 levels, and may be expressed by a BS field of 6 bits in the same manner as the related art. The following Table 2 is an example of an extended BSR table indicating buffer size levels of 150 kbytes to 1500 kbytes.

TABLE 2

| Index | Buffer Size (BS) value [bytes] |
|---|---|
| 0 | BS = 150000 |
| 1 | 150000 < BS <= 150100 |
| 2 | 150100 < BS <= 150120 |
| 3 | 150120 < BS <= 150140 |
| 4 | 150140 < BS <= 150170 |
| 5 | 150170 < BS <= 150190 |
| 6 | 150190 < BS <= 150220 |
| 7 | 150220 < BS <= 150260 |
| 8 | 150260 < BS <= 150310 |
| 9 | 150310 < BS <= 150360 |
| 10 | 150360 < BS <= 150420 |
| 11 | 150420 < BS <= 150490 |
| 12 | 150490 < BS <= 150570 |
| 13 | 150570 < BS <= 150670 |
| 14 | 150670 < BS <= 150780 |
| 15 | 150780 < BS <= 150910 |
| 16 | 150910 < BS <= 151070 |
| 17 | 151070 < BS <= 151250 |
| 18 | 151250 < BS <= 151460 |
| 19 | 151460 < BS <= 151710 |
| 20 | 151710 < BS <= 152000 |
| 21 | 152000 < BS <= 152340 |
| 22 | 152340 < BS <= 152740 |
| 23 | 152740 < BS <= 153210 |
| 24 | 153210 < BS <= 153760 |
| 25 | 153760 < BS <= 154400 |
| 26 | 154400 < BS <= 155150 |
| 27 | 155150 < BS <= 156030 |
| 28 | 156030 < BS <= 157060 |
| 29 | 157060 < BS <= 158260 |
| 30 | 158260 < BS <= 159670 |
| 31 | 159670 < BS <= 161320 |
| 32 | 161320 < BS <= 163260 |
| 33 | 163260 < BS <= 165520 |
| 34 | 165520 < BS <= 168170 |

TABLE 2-continued

| Index | Buffer Size (BS) value [bytes] |
|---|---|
| 35 | 168170 < BS <= 171270 |
| 36 | 171270 < BS <= 174900 |
| 37 | 174900 < BS <= 179150 |
| 38 | 179150 < BS <= 184130 |
| 39 | 184130 < BS <= 189950 |
| 40 | 189950 < BS <= 196770 |
| 41 | 196770 < BS <= 204760 |
| 42 | 204760 < BS <= 214110 |
| 43 | 214110 < BS <= 225050 |
| 44 | 225050 < BS <= 237870 |
| 45 | 237870 < BS <= 252870 |
| 46 | 252870 < BS <= 270430 |
| 47 | 270430 < BS <= 290990 |
| 48 | 290990 < BS <= 315070 |
| 49 | 315070 < BS <= 343250 |
| 50 | 343250 < BS <= 376240 |
| 51 | 376240 < BS <= 414870 |
| 52 | 414870 < BS <= 460090 |
| 53 | 460090 < BS <= 513040 |
| 54 | 513040 < BS <= 575020 |
| 55 | 575020 < BS <= 647590 |
| 56 | 647590 < BS <= 732550 |
| 57 | 732550 < BS <= 832010 |
| 58 | 832010 < BS <= 948460 |
| 59 | 948460 < BS <= 1084790 |
| 60 | 1084790 < BS <= 1244390 |
| 61 | 1244390 < BS <= 1431250 |
| 62 | 1431250 < BS <= 1500000 |
| 63 | BS > 1500000 |

In the meantime, in order to classify a new short BSR and a new long BSR from the short BSR and the long BSR according to the related art, LCID (logical channel ID) values applied to respective subheaders are allocated one by one. Afterwards, the new Short BSR will be referred to as a Short BSR-CA, and the new Long BSR will be referred to as a Long BSR-CA.

First of all, the Short BSR-CA will be described. If the buffer size of the LCG exceeds 150 kbytes, the Short BSR-CA will be used. In other words, LCID of the subheader is set to a value corresponding to the Short BSR-CA. Although a Short BSR MAC CE format of the related art is used as a Short BSR-CA MAC CE format, the BS field is set on the basis of the extended BSR table indicating buffer size levels of 150 kbytes to 1500 kbytes as illustrated in Table 2.

FIG. 9 is a diagram illustrating a MAC subheader and a MAC CE format of a short BSR-CA according to the embodiment of the present invention.

Referring to FIG. 9, the user equipment sets LCID of the MAC subheader to a value corresponding to the Short BSR-CA if one LCG exists to transmit data and its buffer size exceeds 150 kbytes. Also, the BS field of the MAC CE is set to index of the extended BSR table indicating 150 kbytes to 1500 kbytes. Additionally, ID Of the corresponding LCG is added prior to the BS field.

Next, the Long BSR-CA will be described. If any one of LCGs has a buffer size exceeding 150 kbytes, the Long BSR-CA will be used. In other words, LCID of the subheader is set to a value corresponding to the Long BSR-CA. However, a bitmap field indicating LCG of which buffer size information is included is added to the Long BSR-CA MAC CE format. Buffer size information of the corresponding LCG is included only if a bit corresponding to each LCG is set to 1 in the bitmap. Preferably, BSR table ID indicating a buffer size level table to which the BS field for each LCG refers may be added.

FIG. 10 is a diagram illustrating a MAC subheader and a MAC CE format of a long BSR-CA according to the embodiment of the present invention.

The user equipment uses a Long BSR-CA format of FIG. 10 if two or more LCGs exist to transmit data and even one of the LCGs has a buffer size exceeding 150 kbytes. Even if one LCG exists to transmit data, the Long BSR-CA format may be used.

First of all, the user equipment sets LCID of the MAC subheader to a value corresponding to the Long BSR-CA to use the Long BSR-CA format. Next, LCG bitmap exists in the first byte of the MAC CE to indicate LCG of which BS field is included in the MAC CE. Since four LCGs are defined in the current LTE system, 4 bits are sufficient for the bitmap size. However, if the number of LCGs is increased later, LCG bitmap size may be increased. Each bit of the LCG bitmap is mapped into LCG ID one to one, and buffer size information of each LCG may be included after LCG bitmap. Buffer size information is included for LCG only in which a corresponding bit of the LCG bitmap is set to 1.

Corresponding buffer size level is included in the BS field of each LCG, and BSR table ID indicating which table of Table 1 and Table 2 is based to determine the buffer size level is added prior to the BS field. Although Table 1 of the related art and Table 2 which is the extended BSR table have been described in this embodiment, a plurality of tables quantizing buffer size in more detail may be defined, and the plurality of tables may selectively be referred to by using the BSR table ID.

FIG. 11 is another diagram illustrating a MAC subheader and a MAC CE format of a short BSR-CA according to the embodiment of the present invention.

In the same manner as the Long BSR of the related art, supposing that buffer size information for four LCGs is included, LCG bitmap is not required for the Long BSR-CA. In this case, MAC CE may be configured like FIG. 11. In other words, as compared with FIG. 10, no bitmap field exists, and buffer sizes for four LCGs are included in the order of LCG IDs. BSR table ID indicating which table is referred to generate buffer size level information included in the BS field is included prior to each BS field.

Figure 12:
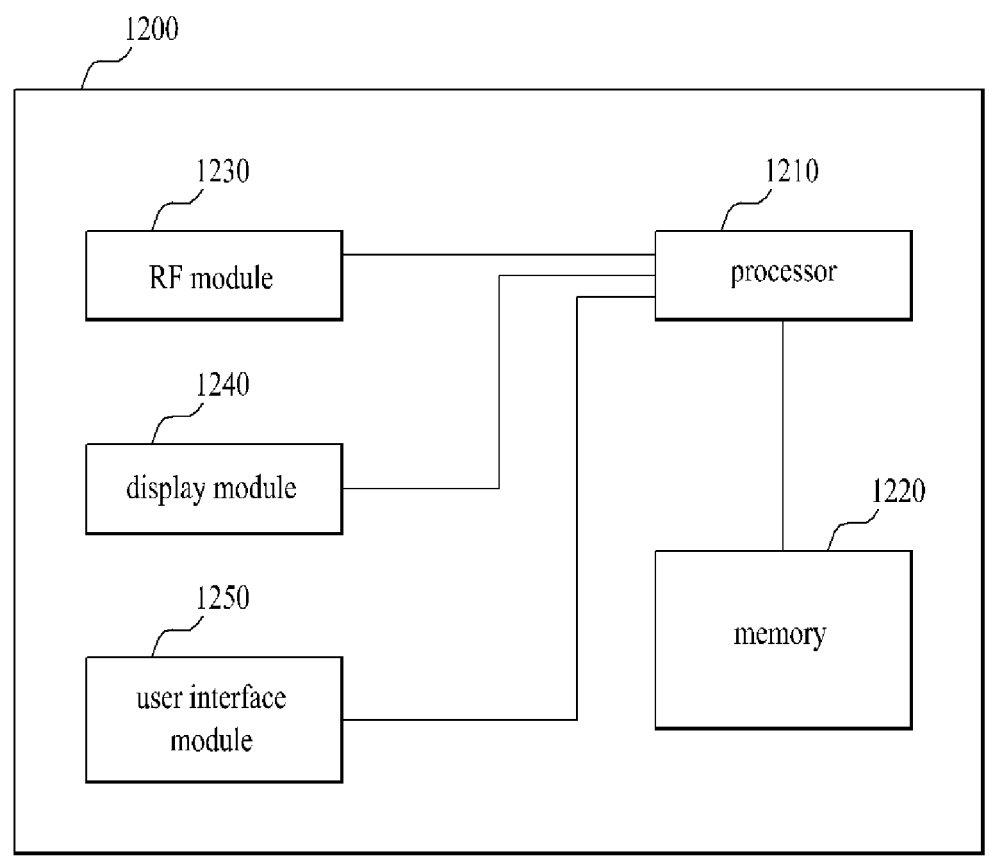
FIG. 12 is a block diagram illustrating a communication apparatus according to the embodiment of the present invention.

FIG. 12 is a block diagram illustrating a communication apparatus according to one embodiment of the present invention.

Referring to FIG. 12, the communication apparatus 1200 includes a processor 1210, a memory 1220, a radio frequency (RF) module 1230, a display module 1240, and a user interface module 1250.

The communication apparatus 1200 is illustrated for convenience of description, and some of its modules may be omitted. Also, the communication apparatus 1200 may further include necessary modules. Moreover, some modules of the communication apparatus 1200 may be divided into segmented modules. The processor 1210 is configured to perform the operation according to the embodiment of the present invention illustrated with reference to the drawings. In more detail, a detailed operation of the processor 1210 will be understood with reference to the disclosure described with reference to FIG. 1 to FIG. 10.

The memory 1220 is connected with the processor 1210 and stores an operating system, an application, a program code, and data therein. The RF module 1230 is connected with the processor 1210 and converts a baseband signal to a radio signal or vice versa. To this end, the RF module 1230 performs analog conversion, amplification, filtering and frequency uplink conversion, or their reverse processes. The display module 1240 is connected with the processor 1210 and displays various kinds of information. Examples of the display module 1240 include, but not limited to, a liquid crystal display (LCD), a light emitting diode (LED), and an organic light emitting diode (OLED). The user interface module 1250 is connected with the processor 1210, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between a relay node and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for transmitting buffer status report from a user equipment in a wireless communication system and an apparatus therefor have been described based on the 3GPP LTE system, they may be applied to various wireless communication systems in addition to the 3GPP LTE system.

The invention claimed is:

1. A method for transmitting a buffer status report (BSR) from a user equipment in a wireless communication system, the method comprising:
generating BSR information; and
transmitting the BSR information to a base station,
wherein the BSR information includes a first field set and two or more second fields indicating buffer size indexes,
wherein the first field indicates that a number of second fields is two or more,
wherein the BSR information further includes bitmap information indicating which logical channel group (LCG) corresponds to each of the two or more second fields,
wherein a size of the bitmap information is a number of LCGs configured to the user equipment, and
wherein the BSR information has a long BSR carrier aggregation (CA) format.

2. The method according to claim 1, wherein the BSR information further includes two or more third fields corresponding to the two or more second fields, each of the two or more third fields identifying a buffer size table referred to determine the buffer size index indicated by a corresponding second field.

3. The method according to claim 1, wherein, if the buffer size associated with the LCG is less than a specific value, the buffer size index is determined by referring to a first buffer size table, which quantizes buffer size less than the specific value, and if the buffer size associated with the LCG is more than the specific value, the buffer size index is determined by referring to a second buffer size table, which quantizes buffer size more than the specific value.

4. The method according to claim 1, wherein the BSR information further includes at least one third field indicating whether the buffer size associated with the LCG is more than a specific value.

5. The method according to claim 3, wherein the specific value is 150 kbytes.

6. The method according to claim 4, wherein the specific value is 150 kbytes.

* * * * *